April 27, 1965 V. Q. RAPP 3,180,072
APPARATUS FOR COOLING, DRYING AND STORING COMPRESSED GAS
Filed Jan. 27, 1965 3 Sheets-Sheet 1

INVENTOR.
VINCENT Q. RAPP
BY
ATTORNEY

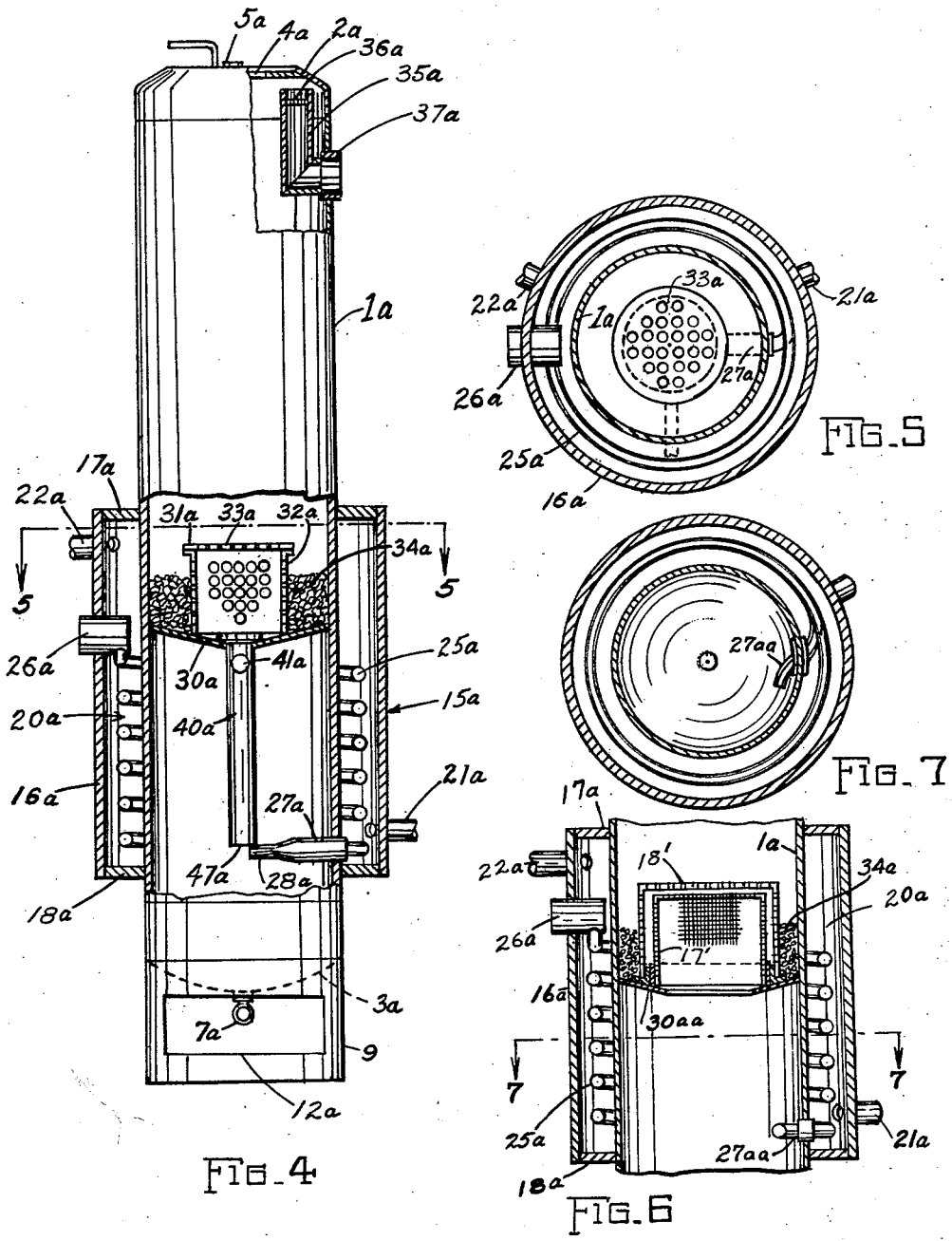

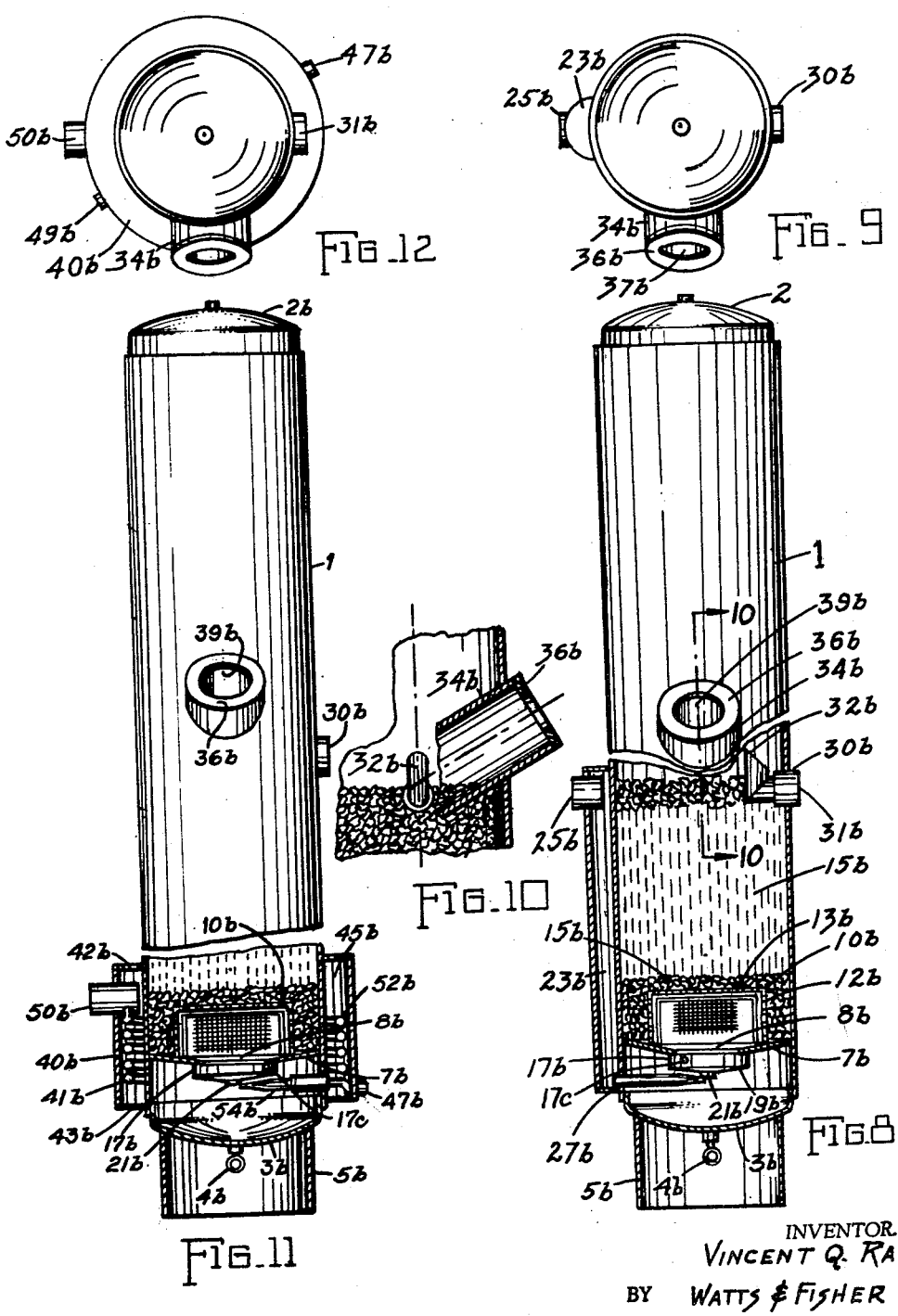

United States Patent Office 3,180,072
Patented Apr. 27, 1965

3,180,072
APPARATUS FOR COOLING, DRYING AND STORING COMPRESSED GAS
Vincent Q. Rapp, 550 Huron St., Erie, Pa.
Filed Jan. 27, 1965, Ser. No. 432,936
10 Claims. (Cl. 55—269)

This application is a continuation-in-part of my applications Serial Nos. 215,638 filed August 8, 1962, 249,839 filed January 7, 1963, and 352,120 filed March 16, 1964, all now abandoned.

This invention relates generally to the art of removing moisture from air under pressure and is particularly concerned with a dryer in which moisture is removed from the air in a new manner by a water soluble desiccant.

It has been proposed heretofore to bring a stream of air under pressure into a cylindrical desiccant container or shell in such a manner that some of the moisture is removed by centrifugal force and most of the remaining moisture is removed by contact with a water soluble desiccant. Since the amount of moisture present in the air entering the container is small, the part thereof which can be removed by centrifugal force is small and the bulk of the moisture must be removed by the desiccant. Thus, the desiccant is dissolved at a rapid rate and extensive efforts have been made to lower that rate of solution or, to say it another way, to prolong the effective life of the desiccant.

When air is subjected to pressure, as by being passed through a compressor, it is heated and frequently attains temperatures of 450° F. or more. Since small amounts of moisture cannot be readily removed by chemical desiccants from air at temperatures in excess of about 120° F., cumbersome and expensive cooling apparatus has been employed to cool the temperature of the compressed air to well below about 120° F. before the air is admitted into a separate desiccator containing chemical desiccants. These coolers are expensive, occupy space which might better be devoted to other purposes and require piping connections for the cooling water, for the air and for the moisture which condenses when the air cools. Even after such condensation, appreciable quantities of moisture remain in the air and may be removed in part by chemical desiccants.

When air has been dried by means of a soluble desiccant, it is ready for use but in some instances, there may be no demand for the air at various times. Unless a receiver or storage chamber is provided for the dried air, it may be necessary to stop the compressor but since that is not desirable, storage tanks have heretofore been provided beyond the desiccator. Such a tank is an added item of equipment, occupies space which may be quite valuable and is expensive and requires maintenance because of the piping connections which must be made between the dryer and it and between it and the downstream pipe line. It would be an economical advantage if a device could be provided which would embody a gas receiver or storage chamber as well as a dryer which included a cooler. Some of those economical advantages could also be realized even if the cooler were separate from such a device.

The present invention aims to avoid the disadvantages traceable to separate coolers, desiccators or dryers, and receivers and provides one device which is a new combination of elements and which can perform the several duties of cooling the compressed air to below about 120° F., and preferably to about 10° F. above the temperature of the cooling water removing moisture from the air, prolonging the life of the desiccant by mechanically removing some of the moisture from the cooled air before it comes into contact with the desiccant and storing the thus treated air for use as and when desired. The present invention contemplates devices which will perform all these duties and functions.

The present invention will be better understood by those skilled in the art from the following specification including the drawings, in which:

FIGURE 4 is a vertical, side elevational view, partly in section, of a combined cooler and dryer embodying the present invention;

FIGURE 5 is a horizontal, sectional view taken on line 5—5 of FIG. 4;

FIGURE 6 is a fragmentary, sectional view of a modified form of the apparatus shown in FIG. 4;

FIGURE 7 is a cross sectional view taken on line 7—7 of FIG. 6;

FIGURE 8 is a vertical, side elevational view partly in section of a combined dryer and receiver embodying the present invention;

FIGURE 9 is a top plan view of the device of FIG. 8;

FIGURE 10 is a vertical, fragmentary, sectional view taken on line 10—10 of FIG. 8;

FIGURE 11 is a vertical, side, elevational view partly in section of a combined cooler, dryer and receiver embodying the present invention; and FIGURE 12 is a top plan view of the device of FIG. 11.

Figures 1, 2, 3:
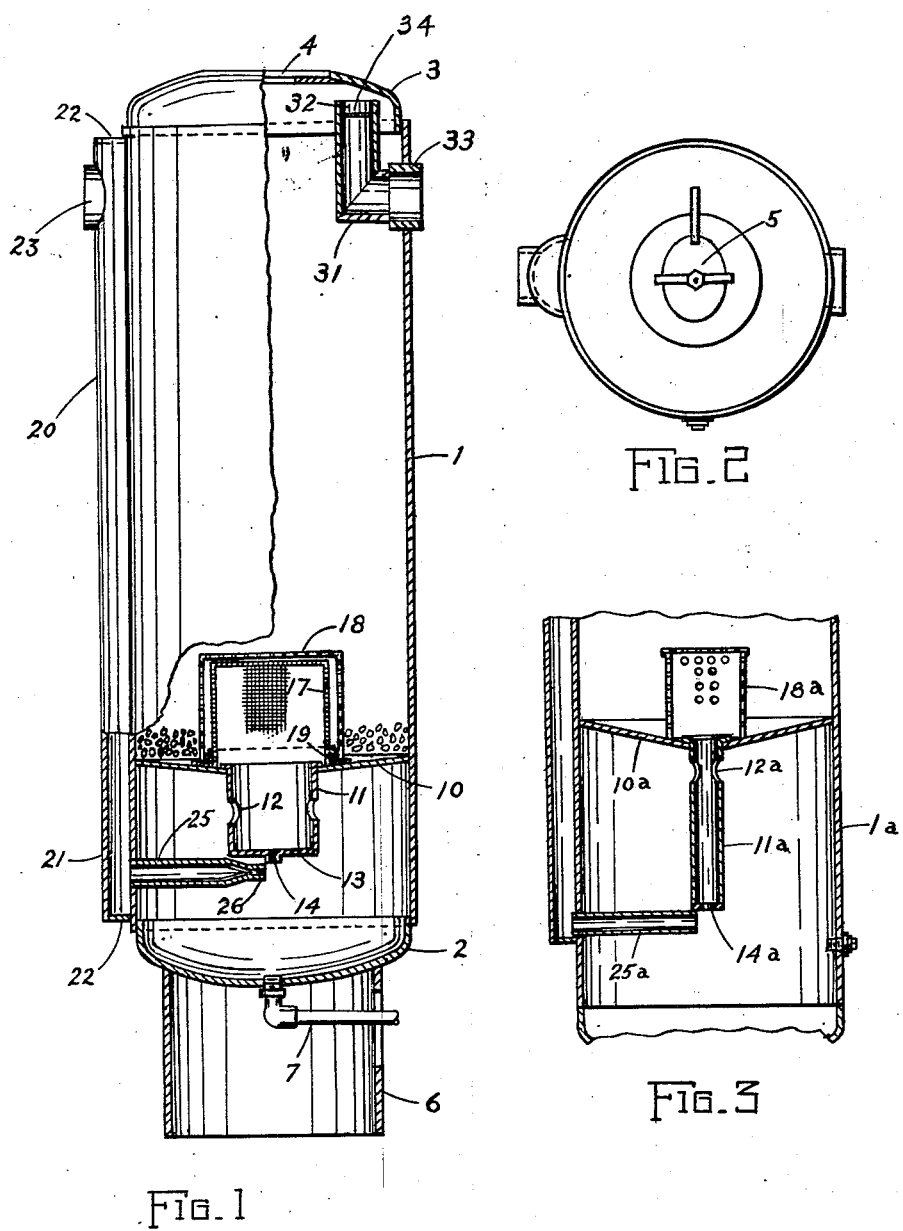
FIGURE 1 is a vertical side elevational view, partly in section, of a dryer embodying the present invention.
FIGURE 2 is a top plan view of the dryer of FIG. 1.
FIGURE 3 is a vertical, central, sectional view of the lower part of a modified form of dryer.

The dryer shown in FIGS. 1 and 2 comprises a cylindrical metal shell 1 having dome-shaped bottom and top ends 2 and 3 welded or otherwise suitably secured thereto. The top end 3 is provided with an opening 4 and a cover 5 therefor through which solids, for example desiccant material, may be charged into the shell 1. A foot ring 6 is attached to the bottom head 3 to rest on a floor and to serve as a means of supporting the cylinder above the floor and providing a space for the liquid drain-out pipe 7 which communicates with the interior of the dryer through the bottom end 2.

A transverse wall 10 extends across the interior of shell 1 a short distance above the bottom end thereof and is provided with a central opening in which is secured a cylinder 11 which has opposed air inlet holes 12 and a bottom 13 provided with a liquid outlet 14. A diffuser baffle assembly is attached to the upper side of wall 10 around the central opening therethrough and consists of a screen 17, a cover 18 and a ring 19. The screen is cylindrical with a top end and an open bottom end attached to a ring 19 which rests on wall 10. Preferably, the screen is made of 20 to 22 gauge stainless steel sheet perforated with about 300 holes per square inch each about .031" in diameter. Stainless steel wire mesh may be substituted for the sheet. The cover 18 serves to protect the screen from damage which might be caused by an iron rod or other tool inserted through top opening 4 to break the desiccant, and is preferably made of steel plate about ⅛" to ³⁄₁₆" thick with perforations about ⅛" to ½" in diameter. The cover rests on wall 10 and may be attached thereto if desired. The diffuser baffle assembly parts 18, 19 and 20 are, preferably, made of stainless steel.

A fitting 20 is attached, as by welding, to the side of shell 1 and includes an elongated arc-shaped part 21, ends 22 and a cylindrical part 23 adapted for attachment to an air pipe (not shown). A pipe 25 is attached at its outer end to shell 1 and extends radially thereinto and terminates closely adjacent to the fluid outlet opening 14 from cylinder 11. Pipe 25 communicates at its outer end with the air passage defined by fitting 20 and thus serves to conduct air from the interior of the fitting to a point where liquid is emerging from cylinder 11.

Near the upper end of shell 1, an outlet elbow 31 is positioned with its inlet end 32 within the dome-shaped top end 3 of the dryer and with its outlet end 33 extending through the wall of shell 1, preferably opposite to, and on the elevation of, the inlet 23 in fitting 20. A screen 34 is preferably positioned in the inlet end 32 to prevent solids from being carried out in the air stream.

When the inlet 23 and outlet 33 are positioned, as shown and just described, the dryer may be placed in an existing pipe line by simply removing part of the pipe line corresponding in length to the distance from inlet 23 to outlet 33 and connecting the dryer to the pipe line in place of that removed part.

A quantity of water soluble desiccant, indicated at 35, is placed in the dryer preparatory to use in drying air and, preferably, this initial charge fills the space from transverse wall 10 up near to the bottom of outlet elbow 31. This desiccant is supported by wall 10 and cover 18.

With the dryer so connected in an air pipe line and so charged with a desiccant, it is ready for operation. Air under pressure, for example about 100 pounds per square inch gauge, is admitted through fitting 20 and is discharged from the outlet end of pipe 25 at considerable velocity. When the outlet end of pipe 25 is flattened, as shown at 26 in FIG. 1, the air stream will be thinned and spread laterally and will not only contact liquid desiccant emerging from hole 14 in the bottom of cylinder 11 but will also continue on across the shell and impinge with considerable force against the opposed inner surface thereof. When the high velocity air encounters the drops of liquid desiccant, it immediately atomizes these drops, thereby converting each droplet into a multitude of droplets and correspondingly increasing the surface area of the liquid desiccant which is exposed to the air. The droplets of desiccant and any moisture in minute globular form in the air will be broken up by contact with the inner surface of the shell. These atomizing actions greatly increase the amount and rate of moisture absorption by the liquid desiccant and thus remove much of the moisture from the air at, and immediately after, the moment of atomization. The moisture removed from the air by such atomizing and impact forces will collect as liquid in the bottom of the dryer and may be periodically removed therefrom through pipe 7.

After the air stream impinges against the shell, it flows into cylinder 11 through holes 12, thence through transverse wall 10, through the small holes in the side and top walls of the screen 17 and cover 18 and thence up to outlet 31 between the granules of the desiccant.

Since the moisture absorbing rate of the desiccant decreases as the concentration of the desiccant in the solution decreases, the atomizing action of the air stream is important. By exposing greater surface areas of the liquid desiccant to the moist air, the desiccant is enabled to continue to absorb moisture at a satisfactory rate even after the desiccant solution becomes quite dilute.

Since increased amounts of moisture may be removed from the air by the above described atomizing and impact action, it follows that the air which passes into contact with the desiccant granules will have decreased amounts of moisture to be removed and, hence, the desiccant will be dissolved at a slower rate or, in other words, its life will be correspondingly prolonged.

The apparatus of FIG. 3 is quite like that of FIGS. 1 and 2 but since the diameter of the shell 1a is much less than that of shell 1 of FIG. 1, the diameter of cylinder 11a is correspondingly less than that of its counterpart 11 of FIG. 1. Furthermore, the inlet pipe 25a is smaller than pipe 25 in FIG. 1 and, hence, it may not be important to flatten the outlet end of pipe 25, as is shown at 26 in FIG. 1. Moreover, the screen 17 of FIG. 1 may be omitted, only a sheet cover 18a, like 18 of FIG. 1, being used.

It will be noted that cylinder 11a is provided with two opposite holes 12a and a bottom hole 14a as compared with the correspondingly numbered part of FIG. 1 and for the same purpose.

It will be understood that air carrying moisture has a tendency to cause steel to rust and, accordingly, it is preferable to make the certain parts of the above described apparatus of stainless steel. Such parts may include parts 10, 10a, 11, 11a, 17, 18, 18a and 19.

The apparatus shown in FIG. 4 comprises a cylindrical metal shell 1a having dome-shaped top and bottom ends 2a and 3a. The top end 2a is provided with an access opening 4a and a cover 5a therefor. The shell 1a has a base 9 secured thereto to rest on the floor and to serve as a support for the shell. The ends 2a and 3a and base 9 may be secured to shell 1a in any suitable manner but, preferably, by being welded thereto.

The bottom end 3a is provided with a liquid drain pipe 7a and this pipe may extend through the opening 12a in the side of base 9 and be connected to a sewer or other receptacle to receive liquid removed from the shell 1a.

A cooling fluid jacket, indicated generally at 15a surrounds and is secured to the lower part of the shell 1a. This jacket consists of a cylinder 16a of greater diameter than shell 1a and top and bottom rings 17a and 18a which are suitably secured, as by welding, to the ends of shell 16a and to shell 1a. The shell 16a and ends 17a and 18a define a space 20a surrounding the shell and suitable for cooling fluid. The jacket 15a has an inlet 21a for admitting cooling liquid to the lower part of chamber 20a and an outlet 22a near the upper end of chamber 20a for fluid flowing from that chamber. It will be understood that inlet 21a is to be connected to a source of cooling liquid (not shown) and that outlet 22a is to be connected to a sewer or the like for disposal of the cooling liquid withdrawn from the jacket 15a.

A tube 25a is disposed in chamber 20a and extends around and out of contact with shell 1a and jacket 15a and is connected at its upper end to a fitting 26a which may be connected to a source (not shown) of compressed gas containing moisture. At its lower end, tube 25a communicates with a nozzle 27a which extends through shell 1a and projects radially into the interior thereof to a point adjacent to the longitudinal center line of the shell. Preferably, the outlet end of nozzle 27a is flattened, as shown at 28a.

A wall 30a extends transversely across the interior of shell 1a and is, preferably, positioned between the top end of tube 25a and the top of jacket 15a. This wall 30a is secured in any suitable manner to the shell 1a, preferably by welding, and is dished downwardly toward the center and is provided with an opening approximately on its center. A foraminous diffuser 31a is suitably supported on, and may be secured to, wall 30a and includes a cylindrical part 32a and a horizontal cover 33a therefor. A plurality of small holes in part 32a and cover 33a serve to admit the gas into contact with the desiccant and to permit liquid desiccant to escape into the chamber below wall 30a. Quantities of a suitable water soluble desiccant 34a, preferably in granular form, are supported on the wall 30a and diffuser 31a and may fill much of the space above these parts and to a level near the upper end of the shell. An angled outlet 35a is positioned in the upper part of shell 1a with a screen 36a in its top intake end and with its lower end 37a extending through the shell 1a for connection to any suitable conduit (not shown) through which the cooled and dried gas may be conducted to a place of use.

A tube 40a extends down through the central opening in wall 30a, is provided with one or more holes 41a adjacent to wall 30a and has a partially closed lower end 47a through desiccant material, which has been converted into liquid form, may escape. The lower end of tube 40a is disposed closely adjacent to the outlet end of nozzle 27a.

The operation of the apparatus of FIGS. 4 and 5 is quite like that of the apparatus shown in FIGURES 1 to 3 but in addition, the moisture carrying gas is cooled before it is discharged into the shell. When the moisture carrying gas, for example compressed air, at an elevated temperature up to about 450° F. is to be dried, it is admitted through fitting 26a into and flows through tube 25a and escapes through nozzles 27a. During its passage through said tube the compressed air is cooled by the water in chamber 30a to below about 120° F. and, preferably, to within about 10° F. of the temperature of the cooling water. During such cooling, moisture in the air condenses and is discharged as such along with the gas through nozzle 27a.

The air and condensed moisture are discharged from nozzle 27a under sufficient velocity to strike against the opposite side of shell 1a, after the manner described above in connection with the apparatus of FIGS. 1 to 3 after which the gas flows up between the granules of desiccant which absorb the moisture so that substantially dry gas will escape through outlet 35a.

As in the apparatus of FIGS. 1 to 3, the desiccant which is converted into liquid by moisture removed from the gas passing between the granules thereof, emerges from tube 40a and is intercepted by the high velocity gas stream entering through nozzle 27a and is carried along with the gas and brought forcibly into contact with the wall of the shell 1a. As a result of the impact of the liquid desiccant with the shell, some of the globules of liquid desiccant are reduced to smaller sizes and the surfaces of the desiccant liquid which are exposed to the gases are increased and if the desiccant in the small globules has not absorbed all the moisture of which it is capable, it will absorb more moisture from the air.

The modification of the present invention shown in FIGS. 6 and 7 is generally like that shown in FIGS. 4 and 5, similar parts being indicated by the same reference characters.

The transverse wall 30aa has an enlarged central opening around and above which is disposed a diffuser assembly consisting of a cup-shaped screen 17' and a cup-shaped cover 18' made of heavier metal and serving to bear most of the weight of the desiccant which surrounds the diffuser and fills most of the chamber above transverse wall 30aa. The lower end of the tube 25a extends through shell 1a and is provided with a nozzle 27aa which is curved to direct the entering air stream more or less tangentially against the inner surface of the shell 1a so that the stream will swirl around the inner surface of shell 1a thereby subjecting the liquid globules to centrifugal force which is sufficient to cause them to adhere to and run down the shell and collect in the bottom end thereof while the air continues to swirl around in the chamber below transverse wall 30aa and then to rise up through the diffuser and into contact with the granules of desiccant 34a thereabove.

The modification of the invention shown in FIGS. 6 and 7 is quite satisfactory in that much of the moisture in the air liberated through nozzle 27aa is separated from the air before the air contacts the desiccant granules but is not as satisfactory as the apparatus of FIGS. 4 and 5 since there is less tendency for the air to atomize the globules of desiccant which emerge through the opening in transverse wall 30aa.

The apparatus shown in FIGURES 8 to 10 comprises an elongated cylindrical shell 1b having a closed top end 2b and a closed bottom end 3b provided with a valve controlled outlet 4b through which liquid may be drawn as desired. The shell 1b is supported on a pedestal 5b which is adapted to rest on a floor and is preferably welded to the bottom end 3b of the shell.

A transverse wall 7b is secured to the inner surface of shell 1b near the bottom wall 3b and extends across the interior thereof. This wall 7b is provided with a central opening 8b. On wall 7b a foraminous diffuser 10b rests around central opening 8b and comprises a vertical, cylindrical wall 12b and a horizontal wall 13b.

As is indicated, these walls 12b and 13b are perforated to permit the flow of gas, such as air under pressure, therethrough while preventing flow in the opposite direction of granules of desiccant material 15b which rests on wall 7b and diffuser 10b and extends up to about the middle of shell 1b.

A hollow cylinder 17b depends from wall 7b around the central opening 8b and has a lower end wall 19b provided with a centrally disposed small diameter liquid outlet hole 21b through which liquid desiccant may pass.

A gas inlet pipe 23b which is attached to the side of cylinder 1b and extends downwardly along the side thereof has a gas inlet opening 25b at its upper end. A radially extending tube 27b extends through the side of shell 1b and terminates adjacent to liquid outlet hole 21b and serves to conduct gas under pressure from the interior of pipe 23b into contact with liquid desiccant passing through hole 21b.

The shell 1b is provided with a gas outlet pipe 30b which, preferably, has its outlet end 31b in the horizontal plane of inlet 25b and its inlet end 32b above its outlet end 31b. Means is provided for conducting granules of water soluble desiccant material into the space between wall 7b and diffuser 10b and the inlet end 32b of gas outlet pipe 30b. This means comprises a tube 34b which extends inwardly through the side of shell 1b and downwardly to approximately the center line of the shell. This tube is provided with a ring 36b at its outer end which has a hole 39b which may be fitted with a plug or cap or any suitable shape and type and adequate to prevent escape of gas under pressure through pipe 34b.

When granules of desiccant material are to be charged into the shell 1b, they are fed into the outer end of tube 34b and flow through that tube and fill the space between the wall 7b and diffuser 10b and the lower end of the tube 34b. The lower end of tube 34b is so disposed with respect to the inlet end 32b of the gas outlet pipe 30b that the surface level of granules of desiccant material in the shell 1b does not rise above the inlet end of the outlet pipe. Since tube 34b is positioned remote from the top end wall 2b of shell 1b, in fact as illustrated, at about the vertical mid-point of the shell, the space above the surface of the desiccant material serves as a storage space for gas which has passed through the desiccant material and been dried thereby. Since the volume of this space is considerable, a large quantity of gas can be stored in it and drawn out, as desired.

In the embodiment of the present invention shown in FIGS. 11 and 12, many of the parts are like those of corresponding numbers shown on FIGS. 8 to 10 and described above. The parts additional to those shown in FIGS. 8 to 10 include a cooling liquid jacket 40b which is composed of a cylindrical wall 41b and top and bottom walls 42b and 43b which are attached to the ends of wall 41b and to the outer surface of shell 1b. This jacket surrounds the lower end of shell 1b and defines a liquid cooling chamber 45b having a liquid inlet 47b and a liquid outlet 49b. The jacket is provided with an air inlet 50b which extends through the side of the jacket and communicates with a tube 52b which is coiled around the shell within the jacket and which has a radially extending outlet end 54b positioned to discharge gas under pressure against liquid desiccant passing through hole 21b in the lower end of cylinder 17b.

When liquid coolant, such as water, is passed through jacket 40b and gas under pressure to be dried, for example compressed air, is passed through coil 52b, the coolant will extract heat from the gas with possible condensation of some of the moisture in the gas. When the gas is discharged at high velocity against liquid desiccant passing through the liquid outlet hole 21b, the globules of desiccant and moisture will impinge against the opposite wall of the shell and be broken and brought into intimate contact with each other with resultant absorption of more moisture by the desiccant. After impinging against the wall of the shell, as just described, the gas rises and passes through the holes 17c in the side of the hollow cylinder and thence up through the opening in wall 7b and through the diffuser 19b where the gas contacts with the globules of desiccant material and gives up its moisture to them.

If desired, cylinder 17b may be omitted and the pipe through which the air is discharged into the lower part of the shell 1b may be positioned other than radially of the shell. For example, the pipe through which the air is discharged might be directed along the inner surface of the shell 1b so as to direct the air stream along the side walls of shell 1b. Such an air stream would eventually leave the walls of the shell and rise through opening 8b in wall 7b after which the operation of the device will be substantially as described above. Thus, the apparatus of FIGS. 8 and 12 serves to cool the compressed gases as well as to dry and store them.

While various suitable desiccant materials may be used for the purpose of removing moisture from gases in each of the several embodiments of the invention above described, one such material which has been said to be highly satisfactory consists of about 100 parts by weight of shotted urea and about 1 to about 5 parts by weight of hi-test calcium chloride flake (calculated as an anhydrous salt) and between about ¼ and about ½ parts by weight of an inhibitor consisting of about 96% of sodium borate and about 4% of sodium nitrite.

The sodium borate ingredient may consist of any of the sodium meta borates, with or without water of crystallization, and any of the sodium tetraborates, with or without water of crystallization. Preferably, the tetraborate with five molecules of water is employed but the tetraborate containing ten molecules of water is quite satisfactory. It will be understood that the inhibitor ingredients may be varied from the foregoing preferred amounts. For example, the nitrite may range from about 2.0% to about 5.0% with the borate varying inversely therewith.

The foregoing disiccant may be made as follows.

The calcium chloride is dissolved in water and is distributed more or less equally over the top surface of the beads of shots of urea while they are being rotated, for example in a drum mixer. This rotation is continued until a substantially uniform mixing of the chloride and urea has been attained. Then the inhibitor is sprinkled onto the mixture in the drum while the rotation of the drum is continued for another short period of time, preferably not less than a minute and a half. The contents of the drum may then be placed in polyethylene cartons and sealed.

It will be understood that when the moisture ladened air passes upwardly in shell 1b and contacts with the pellets of desiccant, the calcium chloride will absorb moisture and hold it in contact with the urea with resultant dissolution of the latter. At the same time, moisture coming into direct contact with urea will dissolve the latter. The urea which is so dissolved or brought into solution moves down into the cylinder 17b and emerges through the small hole 21b where it contacts with air entering under high pressure as described above.

While the invention has been described with particular reference to compressed air, it will be understood that the invention is susceptible of use with compressed gases other than air and containing likuid material in addition to moisture, for example small amounts of oil which are frequently present in compressed air. The above described desiccant seems to possess the property of absorbing small amounts of oil from the air. When small amounts of liquids other than oil and moisture are present in the air being dried and the above described desiccant will not absorb them, small amounts of any suitable commercial solvent capable of absorbing such liquids may be incorporated in the desiccant.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. An air dryer comprising a cylindrical metal shell having dome-shaped bottom and top ends with a liquid outlet through the bottom end and an opening in the top end provided with a removable closure,
    (a) a transverse wall extending across the interior of the shell and attached thereto above the bottom end and having a central opening therethrough,
    (b) a hollow cylinder around said opening and extending downwardly from said wall, having inlet openings in its side and a lower end wall having a centrally disposed small liquid outlet hole therein, a foraminous diffuser extending upwardly from said wall around said central opening,
    (c) a gas inlet pipe extending through a side of said shell below said transverse wall and having its outlet end positioned adjacent to the lower end of said liquid outlet hole from the hollow cylinder to direct a stream of gas against drops of liquid passing through said outlet hole,
    (d) granules of water soluble disiccant material filling a major part of the shell above and resting on said transverse wall and diffuser,
    (e) and an outlet for gas in the upper part of said shell.

2. An air dryer comprising a cylindrical metal shell provided with a liquid outlet in its lower portion,
    (a) a transverse wall extending across the interior of the shell and attached thereto and having a central opening therethrough,
    (b) a hollow cylinder around said opening and extending downwardly from said wall, having inlet openings in its side and a lower end wall having a centrally disposed small liquid outlet hole therein,
    (c) a foraminous diffuser extending upwardly from said wall around said central opening,
    (d) a gas inlet pipe extending through a side of said shell below said transverse wall and having its outlet end positioned adjacent to the lower end of said liquid outlet hole from the hollow cylinder to direct a stream of gas against drops of liquid passing through said outlet hole,
    (e) granules of water soluble desiccant material filling a major part of the shell above and resting on said transverse wall and diffuser,
    (f) and an outlet for gas in the upper part of said shell.

3. An air dryer comprising a cylindrical metal shell provided with a liquid outlet in its lower portion,
    (a) means forming a gas passage extending along the shell from near one end to near the other end thereof,
    (b) a transverse wall extending across the interior of the shell and attached thereto and having a central opening therethrough,
    (c) a hollow cylinder around said opening and extending downwardly from said wall, having inlet openings in its side and a lower end wall having a centrally disposed small liquid outlet hole therein,
    (d) a foraminous diffuser extending upwardly from said wall around said central opening,
    (e) a gas inlet pipe extending through a side of said shell below said transverse wall and communicating with said gas passage near said other end thereof and having its outlet end positioned adjacent to the lower end of said liquid outlet hole from the hollow cylinder to direct a stream of gas against drops of liquid passing through said outlet hole, (f) granules of water soluble desiccant material filling a major part of the shell above and resting on said transverse wall and baffle, (g) and an outlet for gas in the upper part of said shell.

4. A device for use in drying air comprising a cylindrical metal shell having upper and lower ends, a gas outlet near the upper end of the shell and a liquid outlet in its lower portion, (a) means forming a gas passage along the shell and having an inlet near the upper end of the shell, (b) a transverse wall extending across the interior of the shell and attached to the shell and having a central opening therethrough, (c) a foraminous diffuser baffle on said wall around said opening, (d) a gas inlet pipe communicating at one end with the lower part of said gas passage and extending radially of said shell to approximately the longitudinal center line thereof, (e) and a hollow cylinder extending downwardly from said wall and having inlet openings in its side and a lower end wall having a central small outlet hole for drops of liquid disposed closely adjacent to the outlet end of said inlet pipe.

5. A gas dryer comprising a cylindrical shell having closed top and bottom ends, a liquid outlet through its bottom end and a gas outlet near its top end, (a) a cooling liquid jacket surrounding and attached to the lower portion of said shell and having a liquid inlet near one end and a liquid outlet near its other end, (b) a transverse wall positioned above the bottom end of the shell and having a central opening therethrough, and a foraminous diffuser extending upwardly from said wall around said central opening, (c) granules of water soluble desiccant material filling a major part of the shell above and resting on said transverse wall and diffuser, and (d) means including a tube in the jacket and extending around the shell for conducting gases through the cooling liquid jacket and into the shell below said transverse wall.

6. A gas dryer comprising a cylindrical shell having closed top and bottom ends, a liquid outlet through its bottom end and a gas outlet near its top end, (a) a cooling liquid jacket surrounding and attached to the lower portion of said shell and having a liquid inlet near one end and a liquid outlet near its other end, (b) a transverse wall positioned above the bottom end of the shell and having a central opening therethrough, and a foraminous diffuser extending upwardly from said wall around said central opening, (c) granules of water soluble desiccant material filling a major part of the shell above and resting on said transverse wall and diffuser, and (d) a tube in the jacket to be connected to a source of gas to be dried and extending around the shell for conducting gases through the cooling liquid jacket, said tube having an outlet end opening into the shell below said transverse wall and positioned to direct a gas stream along the side surface of the shell.

7. A gas dryer comprising a cylindrical shell having closed top and bottom ends, a liquid outlet through its bottom end and a gas outlet near its top end, (a) a cooling liquid jacket surrounding and attached to the lower portion of said shell and having a liquid inlet near one end and a liquid outlet near its other end, (b) a transverse wall positioned above the bottom end of the shell and having a central opening therethrough, a foraminous diffuser extending upwardly from said wall around said central opening, and a tube depending from said wall around said opening and having a bottom outlet for liquid and inlets thereabove for gas, (c) granules of water soluble desiccant material filling a major part of the shell above and resting on said transverse wall and diffuser, and (d) a tube in the jacket to be connected to a source of gas to be dried and extending around the shell for conducting gases through the cooling liquid jacket, said tube having an end portion extending radially into the shell below said transverse wall and its outlet adjacent to the bottom outlet of said depending tube.

8. The combination of elements set forth in claim 2 in which the inlet end of the gas outlet pipe is remote from the top of the shell and means is provided for conducting the desiccant into the shell, said means including a downwardly inclined tube extending through the side of the shell.

9. The combination of elements set forth in claim 2 in which a cooling liquid jacket surrounds the lower part of the shell, is provided with an inlet and an outlet for cooling liquid, and the gas inlet pipe is coiled around the shell within the jacket, and in which means is provided for conducting the granules of the desiccant into the shell, said means including a downwardly inclined tube extending through the side of the shell remote from the top of the shell.

10. The combination of elements set forth in claim 2 in which the desiccant material comprises about 100 parts by weight of shotted urea, about 1 to 5 parts by weight of calcium chloride and between about ¼ and ½ parts by weight of a corrosion inhibitor.

References Cited by the Examiner

UNITED STATES PATENTS

| | | | |
|---|---|---|---|
| 1,086,089 | 2/14 | Schou | 261—11 |
| 1,661,104 | 2/28 | Barnebey | 55—195 |
| 1,772,089 | 8/30 | Smith | 55—221 |
| 2,504,184 | 4/50 | Dawson | 55—316 |
| 2,642,951 | 6/53 | Norton | 55—387 X |
| 3,050,920 | 8/62 | Norton | 55—388 |

FOREIGN PATENTS

| | | |
|---|---|---|
| 886,813 | 7/43 | France. |
| 798,088 | 7/58 | Great Britain. |

REUBEN FRIEDMAN, *Primary Examiner.*